Oct. 6, 1942.   E. A. ZETTERQUIST.   2,297,852
TURBINE CYLINDER CONSTRUCTION
Filed July 10, 1941
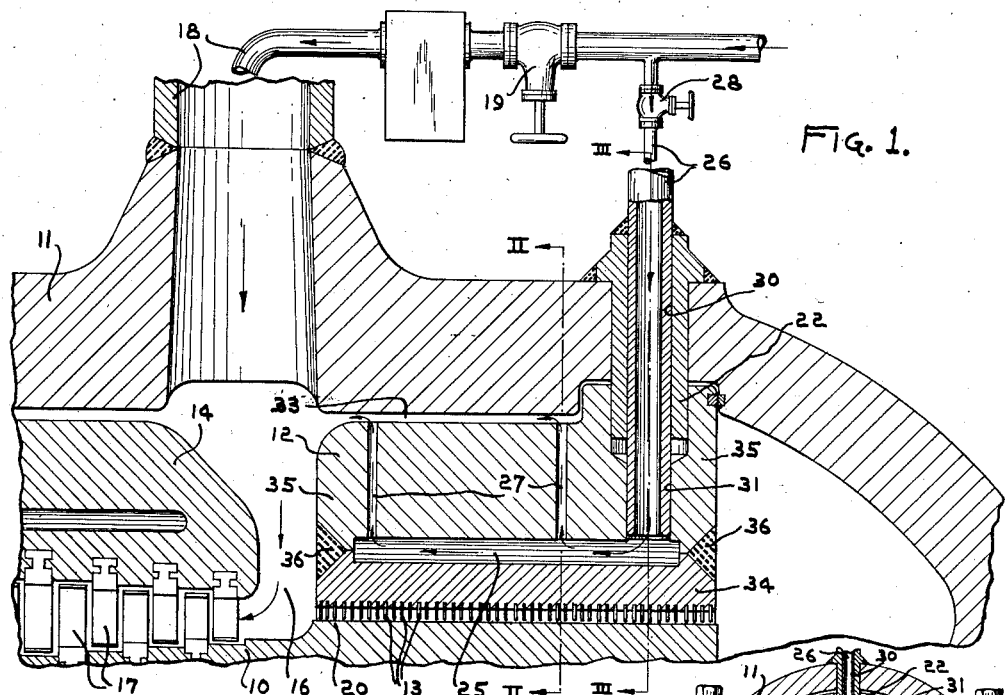
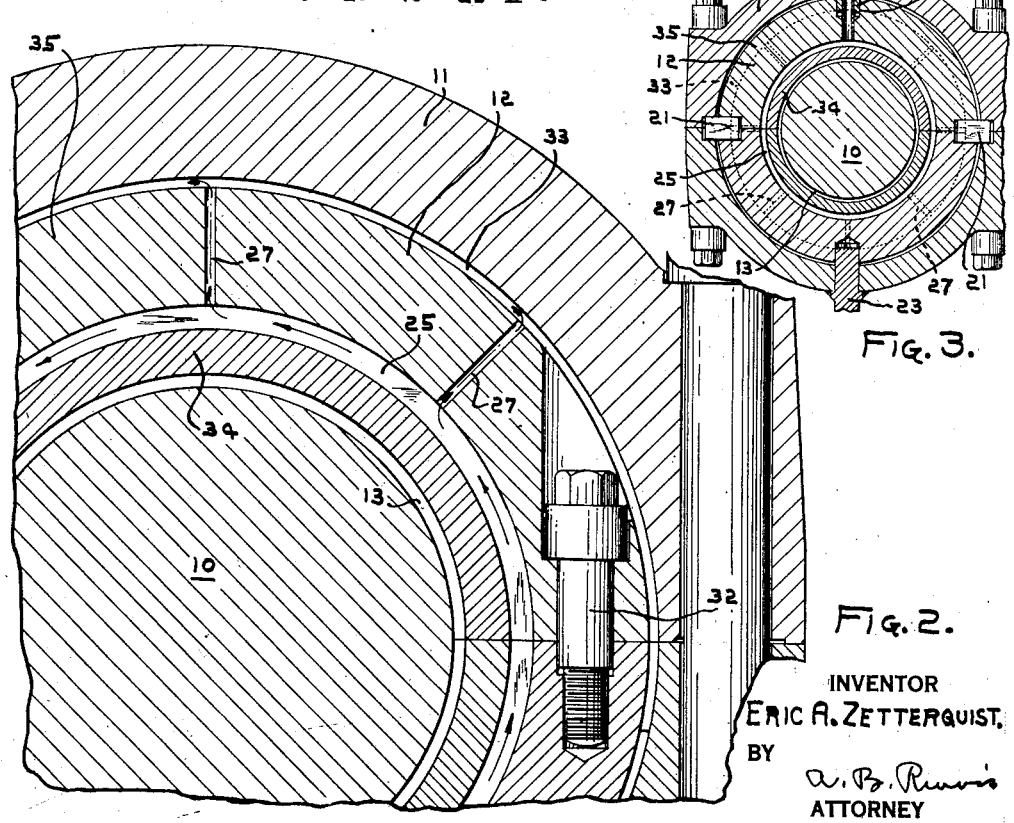
INVENTOR
Eric A. Zetterquist.
BY
ATTORNEY Patented Oct. 6, 1942

2,297,852

UNITED STATES PATENT OFFICE 2,297,852

TURBINE CYLINDER CONSTRUCTION

Eric A. Zetterquist, Drexel Hill, Pa., assignor to Westinghouse Electric & Manufacturing Company, East Pittsburgh, Pa., a corporation of Pennsylvania Application July 10, 1941, Serial No. 401,705

8 Claims. (Cl. 253—39)

The invention relates to an elastic-fluid turbine, wherein the cylinder and rotor carry interfitting stationary and rotating parts defining close clearances and wherein the stationary parts are carried by ring structure or structures supported within the cylinder, and it has for an object to provide means for heating the structure or structures to avoid rubbing incident to differential expansion and contraction.

More particularly, the invention relates to dummy or blade rings carried iternally of a turbine cylinder and it has for an object to equip such rings with means for heating them to avoid rubbing, as when starting up or shutting down the turbine.

These and other objects are effected by the invention as will be apparent from the following description and claims taken in connection with the accompanying drawing, forming a part of this application, in which:

Fig. 1 is a fragmentary, longitudinal, sectional view of a turbine having the improvement applied thereto;

Fig. 2 is a sectional view taken along the line II—II of Fig. 1; and

Fig. 3 is a reduced sectional view taken along the line III—III of Fig. 1 showing the means for supporting a ring member from the cylinder.

In the drawing, the elastic-fluid or steam turbine includes a spindle or rotor 10 and a cylinder 11. Within the cylinder and supported thereby, is a ring member 12, for example, a dummy or blade ring, having parts 13, for example, sealing strips, defining close clearance with respect to the spindle. The present invention is concerned particularly with heating of the ring member in order to avoid rubbing.

As shown, the turbine cylinder encloses and supports a dummy ring 12 and an adjacent blade ring 14; and, while the invention is applicable to either of these rings, it is shown and described in detail with respect to the dummy ring. The turbine has a steam admission space 16 for the blading 17, the space being supplied with steam by a conduit 18 equipped with a throttle valve 19. At the side of the space opposite to the blading, the spindle is formed with a dummy piston 20 surrounded by the dummy ring 12, the strips 13 sealing the annular clearance space therebetween.

As is customary practice, the ring members are supported from the cylinder by the lugs 21 at the horizontal joint and by the dowels 22 and 23 at the top and the bottom, the lugs and dowels cooperating to provide for radial expansion and contraction of the ring member relatively to the cylinder without disturbance of the axis of the ring member so that alignment of the latter with the spindle may be preserved.

Referring now to the means for heating the dummy ring 12, the latter is formed with an annular chamber 25 supplied with steam by means of a conduit 26, and steam is discharged from the chamber by one or more passages 27 formed in the ring member.

The conduit 26 preferably branches from the main conduit 18 ahead of or at the inlet side of the throttle valve 19, and it has an adjusting valve 28. Therefore, steam may be supplied to the chamber with the throttle valve closed, this being necessary just before starting up or immediately after shutting down in order to avoid rubbing.

To communicate with the chamber 25, the conduit 26 must pass through the wall of the cylinder; and, as shown, it extends through the bore or hollow 30 of one or both of the dowel pins, and its inner end has a sliding fit in the opening 31 formed in the ring.

As shown in Fig. 2, the ring has a substantially uniform radial thickness at each section, the parts thereof being bored to receive dowel studs 32 and one of the parts being relieved or counterbored so that the studs do not extend beyond the periphery thereof. Furthermore, the passages 27 preferably discharge into the space 33 about the ring.

To facilitate manufacture of the dummy ring with the circulating chamber and passage, it is preferably comprised by inner and outer annular parts 34 and 35. These parts are machined and then brought together and welded at the ends, as shown at 36, the parts complementally forming the annular chamber 25 and the outer part having the openings or passages 27 and 31.

With circulation of heating steam established through the dummy ring annular chamber prior to starting, the ring will expand, increasing the clearance between the sealing strips and the spindle to avoid rubbing. As the machine is being started and load is applied to the straight reaction type of turbine shown in Fig. 1, the spindle-balancing piston 20 will expand until normal running clearance is obtained. After shutdown while the machine is on the turning gear, the dummy ring, because of its smaller mass and greater radiating surface as compared to the spindle, will tend to cool faster than the latter; and, to assure of normal or excess clearance to avoid rubbing, the adjusting valve 28 may be left open for a suitable time interval or be gradually closed.

Where the turbine is of the impulse reaction type, the dummy piston is subjected to the temperature of steam entering the reaction section; however, because of the temperature drop over the impulse section or stage, the dummy circulating steam would be hotter than that leaking past the sealing strips of the dummy piston, and the temperature difference would be greater at light loads than at high loads. With this type of turbine, therefore, it would be necessary to close the adjusting valve after a reasonable load has been established. On the other hand, with a straight reaction in order to avoid excess clearances during operation and the slight loss connected with the throttling of the dummy circulating steam to a lower pressure turbine, as this temperature difference does not occur, the adjusting valve may be left open during turbine operation, providing the capacity of the circulating steam is held sufficiently low to prevent overspeeding in case of loss of load.

While I have shown the invention in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What I claim is:

1. In a turbine, a cylinder; a rotor; a ring member encompassing the rotor and located entirely within the cylinder; means for supporting the ring member from the interior of the cylinder; and means for heating the ring member including an annular chamber formed therein, a conduit extending through the cylinder wall and having its discharge end communicating with said chamber for supplying steam to the latter, and one or more passages formed in the ring member for discharging steam from the chamber to the interior of the cylinder.

2. In a turbine, a cylinder; a rotor having a dummy piston portion; a stationary dummy ring member carried by the cylinder internally of the latter and encompassing the dummy piston portion and defining an annular seal space with respect to the latter; sealing means for the seal space; means providing an annular heating zone within the ring member; means for supplying heating medium to the zone; and means for discharging heating medium from the zone.

3. In a turbine, a cylinder; a rotor; a ring member elongated in an axial direction and encompassing the rotor; parts carried by the ring member and normally defining close clearances with respect to the latter; means for supporting the ring member from the interior of cylinder so that it is free to expand and contract without disturbance of its axis; and means for heating the ring member and including an annular chamber formed therein and elongated in an axial direction, a passage for supplying steam to the chamber, and one or more passages formed in the ring member for discharging steam peripherally thereof into the cylinder.

4. In a turbine supplied with steam by means of a conduit provided with a throttle valve, a cylinder; a rotor; a ring member supported by the cylinder internally of the latter, encompassing the rotor, and defining an annular seal space with respect to the latter; sealing means for the seal space; an annular heating chamber formed in the ring member; a branch conduit connected to said supply conduit at the inlet side of the throttle valve and communicating with said chamber; a valve for the branch conduit; and outlet passages formed in the ring member for discharging medium from the chamber to the interior space of the cylinder.

5. In a turbine, a rotor, a cylinder, a ring member within the cylinder and encompassing the rotor, means for supporting the ring member interiorly of the cylinder so that it may expand and contract relatively to the cylinder without disturbance of its axis, an annular heating chamber formed within the ring member, means for supplying steam to the chamber including a conduit extending through the cylinder wall with its discharge end having a sliding fit with respect to the ring member, and one or more passages formed in the ring member for discharging steam from the chamber.

6. In a turbine, a rotor, a cylinder, a ring member within the cylinder and encompassing the rotor, means including dowel pins for supporting the ring member from the cylinder and one of the dowel pins extending through the cylinder wall and being hollow, an annular heating chamber formed within the ring member, means for supplying steam to the chamber including a conduit extending through the opening of the hollow dowel pin with its discharge end having a sliding fit with respect to the ring member, and one or more passages formed in the ring member for discharging steam from the chamber.

7. In a turbine, a rotor, a cylinder, a ring member within the cylinder and encompassing the rotor, means for supporting the ring member interiorly of the cylinder so that it may expand and contract radially relatively to the cylinder without disturbance of its axis, said means including dowel pins and one of the latter being hollow, an annular heating chamber formed within the ring member, means for supplying steam to the chamber including a conduit extending through the opening of the hollow dowel pin with its discharge end having a sliding fit with respect to the ring member, and one or more passages formed in the ring member for discharging steam from the chamber.

8. In a turbine supplied with steam by means of a conduit provided with a throttle valve, a cylinder; a rotor; a ring member within the cylinder and encompassing the rotor; said ring member being elongated in an axial direction; means including dowel pins for supporting the ring member from the cylinder and one of the dowel pins extending through the cylinder wall and being hollow; an annular heating chamber formed in the ring member and being elongated in an axial direction; a branch conduit connected to said supply conduit at the inlet side of the throttle valve and extending through the opening of the hollow dowel pin with its discharge end having a sliding fit with respect to the ring member; and one or more passages formed in the ring member for discharging steam from the chamber externally of the ring member.

ERIC A. ZETTERQUIST.